US012573233B2

(12) United States Patent
Hashimoto et al.

(10) Patent No.: US 12,573,233 B2
(45) Date of Patent: Mar. 10, 2026

(54) COMPARISON DEVICE, COMPARISON METHOD, AND PROGRAM

(71) Applicant: NEC Corporation, Tokyo (JP)

(72) Inventors: Hiroshi Hashimoto, Tokyo (JP);
Akihiro Hayasaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 423 days.

(21) Appl. No.: 18/025,844

(22) PCT Filed: Sep. 23, 2020

(86) PCT No.: PCT/JP2020/035822
§ 371 (c)(1),
(2) Date: Mar. 10, 2023

(87) PCT Pub. No.: WO2022/064565
PCT Pub. Date: Mar. 31, 2022

(65) Prior Publication Data
US 2023/0351802 A1 Nov. 2, 2023

(51) Int. Cl.
*G06V 40/16* (2022.01)
*G06V 10/774* (2022.01)

(52) U.S. Cl.
CPC .......... *G06V 40/161* (2022.01); *G06V 10/774* (2022.01)

(58) Field of Classification Search
None
See application file for complete search history.

(56) References Cited

U.S. PATENT DOCUMENTS

| | | | |
|---|---|---|---|
| 2016/0110586 A1 | 4/2016 | Hayasaka | |
| 2019/0266389 A1* | 8/2019 | Kagaya | G06V 20/64 |
| 2020/0034977 A1 | 1/2020 | Ide | |
| 2020/0184198 A1 | 6/2020 | Takahashi | |
| 2020/0226394 A1* | 7/2020 | Arima | G06V 20/52 |
| 2020/0293764 A1 | 9/2020 | Osawa et al. | |
| 2022/0148354 A1* | 5/2022 | Ozono | G06T 7/00 |

FOREIGN PATENT DOCUMENTS

| | | |
|---|---|---|
| CN | 111597910 A | 8/2020 |
| CN | 111626213 A | 9/2020 |
| EP | 3499455 A1 | 6/2019 |
| JP | 2007-280250 A | 10/2007 |
| JP | 2016-081212 A | 5/2016 |
| JP | 2017-120609 A | 7/2017 |
| WO | 2018/122960 A1 | 7/2018 |
| WO | 2019/097784 A1 | 5/2019 |
| WO | 2019/102619 A1 | 5/2019 |

OTHER PUBLICATIONS

International Search Report for PCT Application No. PCT/JP2020/035822, mailed on Dec. 15, 2020.
(Continued)

*Primary Examiner* — Leon Viet Q Nguyen
(74) *Attorney, Agent, or Firm* — Sughrue Mion, PLLC

(57) ABSTRACT

A feature point is detected from a face region of a person reflected in an image. A specific area in which the person's face is not covered with an outfitting member is determined in the face region. Collation is performed using the feature point in the specific area.

11 Claims, 5 Drawing Sheets

(56)             References Cited

OTHER PUBLICATIONS

Written opinion for PCT Application No. PCT/JP2020/035822, mailed on Dec. 15, 2020.
JP Office Action for JP Application No. 2022-536700, mailed on Aug. 16, 2022 with English Translation.
JP Office Action for JP Application No. 2022-536700, mailed on Nov. 8, 2022 with English Translation.
Extended European Search Report for EP Application No. 20955159. 7, dated on Oct. 19, 2023.

* cited by examiner

100

COMPARISON DEVICE, COMPARISON METHOD, AND PROGRAM

This application is a National Stage Entry of PCT/JP2020/035822 filed on Sep. 23, 2020, the contents of all of which are incorporated herein by reference, in their entirety.

TECHNICAL FIELD

This disclosure relates to a comparison device, a comparison method, and a program.

BACKGROUND ART

To perform collation of a face of a person as a collating target, a collation process is occasionally performed using facial feature points. Patent Document 1 discloses a technology of a collation process.

CITATION LIST

Patent Literature Document

Patent Document 1: Japanese Patent Application Publication No. 2007-280250 SUMMARY

Technical Problem

It is preferable that a collating target be accurately collated even when a range of collation is partially covered by any outfitting member.

The non-limiting exemplary embodiments aim to provide a comparison device, a comparison method, and a program which can solve the aforementioned problem.

Solution to Problem

According to a first aspect of this disclosure, a collation device is configured to detect a feature point in a face region of a person reflected in an image, determine a specific area in which the person's face is not covered with an outfitting member in the face region, and perform collation using the feature point in the specific area.

According to a second aspect of this disclosure, a collation method is configured to detect a feature point in a face region of a person reflected in an image, determine a specific area in which the person's face is not covered with an outfitting member in the face region, and perform collation using the feature point in the specific area.

According to a third aspect of this disclosure, a program causes a computer of a collation device to implement a means for detecting a feature point in a face region of a person reflected in an image, a means for determining a specific area in which the person's face is not covered with an outfitting member in the face region, and a means for performing collation using the feature point in the specific area.

DESCRIPTION OF EXEMPLARY EMBODIMENTS

Hereinafter, a collation device according to one exemplary embodiment of this disclosure will be described with reference to the drawings.

Figure 1:
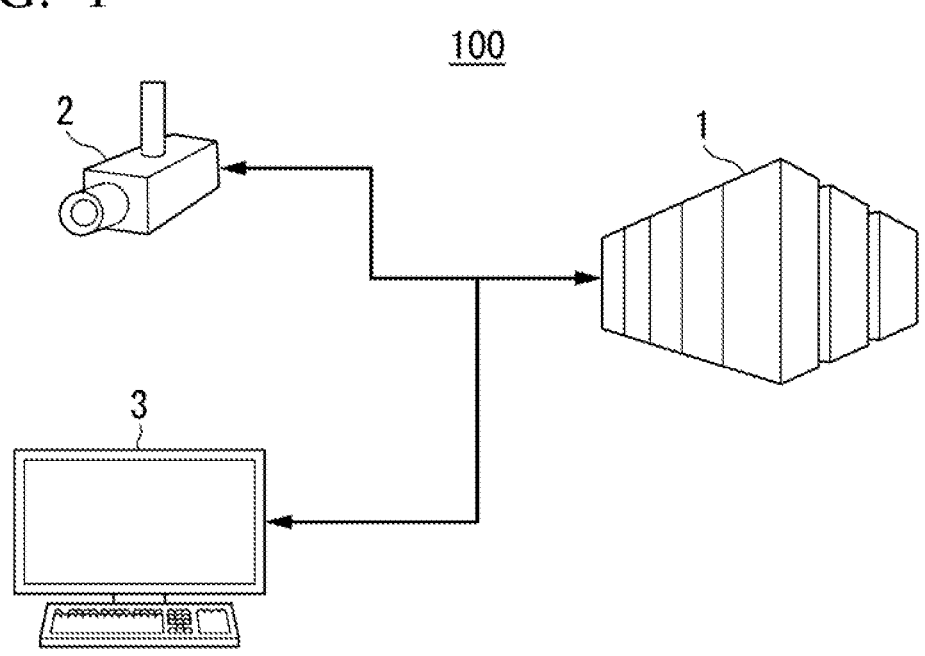
FIG. 1 is a schematic diagram of a collation system according to one exemplary embodiment of this disclosure.

FIG. 1 is a schematic diagram of a collation system according to the present exemplary embodiment.

A collation system 100 may exemplarily include a collation device 1, a camera 2, and a display device 3. The collation system 100 needs to include at least the collation device 1. In the present exemplary embodiment, the collation device 1 is connected to the camera 2 and the display device 3 through communication networks. The camera 2 outputs to the collation device 1 a face image of a person as a collating target. The collation device 2 acquires the face image from the camera 2. The collation device 1 performs a collation process of the face image. The collation device 1 outputs the result of the collation process to an output device such as the display device 3.

For example, the collation process to be performed by the collation device 1 is a process, using multiple persons' face images stored on the collation device 1 and face images acquired from the camera 2, to determine a person's face image matching the face image acquired from the camera 2 among multiple persons' face images stored on the collation device 1.

Figure 2:
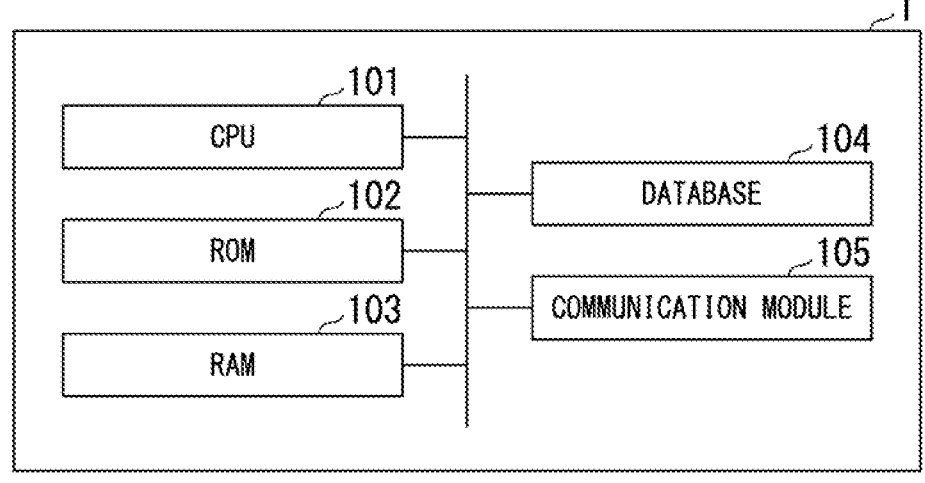
FIG. 2 is a block diagram of a hardware configuration of a collation device according to one exemplary embodiment of this disclosure.

FIG. 2 is a block diagram of a hardware configuration of a collation device.

As shown in FIG. 2, the collation device 1 is a computer including hardware elements such as a CPU (Central Processing Unit) 101, a ROM (Read-Only Memory) 102, a RAM (Random-Access Memory) 103, a database 104, and a communication module 105. Similarly, the display device 3 is a computer including hardware elements.

Figure 3:
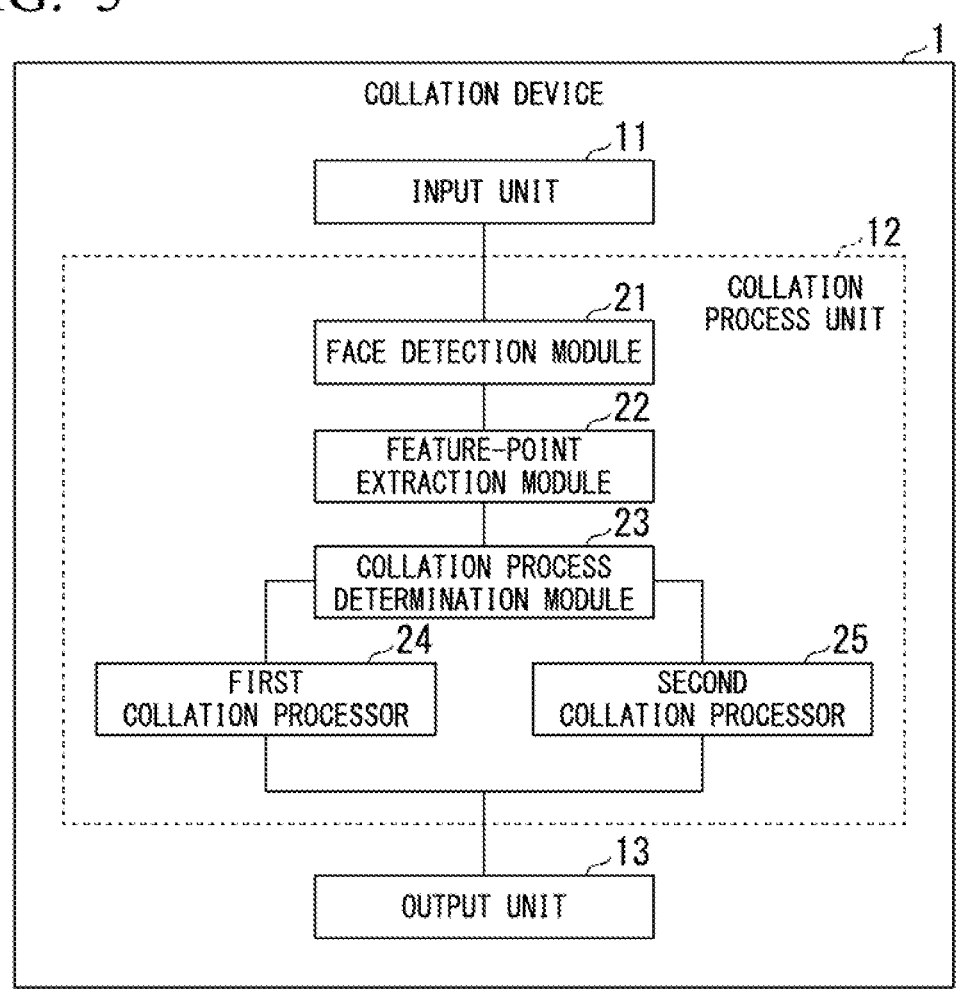
FIG. 3 is a functional block diagram of a collation device according to one exemplary embodiment of this disclosure.

FIG. 3 is a functional block diagram of a collation device.

In the collation device 1, the CPU 101 executes a collation-process program stored on the ROM 102 or the like. Accordingly, the collation device 1 performs various functions such as an input unit 11, a collation process unit 12, and an output unit 13.

The input unit 11 is configured to acquire a face image from the camera 2.

The collation process unit 12 is configured to perform a collation process.

The output unit 13 is configured to output the result of the collation process.

Specifically, the collation process unit 12 is configured to detect feature points from a face region of a person reflected in a face image acquired from the camera 12. When reliability indicating the result of detecting feature points is equal to or above a first threshold value, the collation process unit 12 is configured to perform a first collation process using feature points in the face region. When reliability indicating the result of detecting feature points is below the threshold value, the collation process unit 12 is configured to perform a second collation process using feature points in a specific area of the face region. Herein, the term "reliability" indicates a likelihood of a bare face as indicated by the distribution of feature points detected. The bare face is an original face not partly covered by any outfitting member such as a mask and sunglasses.

The collation process unit 12 is configured to perform a first collation process according to a first collation function for machine learning using the face image including the entire face region of a person as training data.

In addition, the collation process unit 12 is configured to perform a second collation process according to a second collation function for machine learning using an image, including the specific area of a person's face region precluding its lower section, as training image data.

The collation process unit 12 may perform the first collation process when the reliability representing the result of detecting feature points becomes equal to or above the first threshold value in most of a certain range of a face image including the eyes, nose, mouth, and eyebrows, but the collation process unit 12 may perform the second collation process when the reliability representing the result of detecting feature points becomes low in another range of the face image precluding the eyes and eyebrows.

Figure 4:
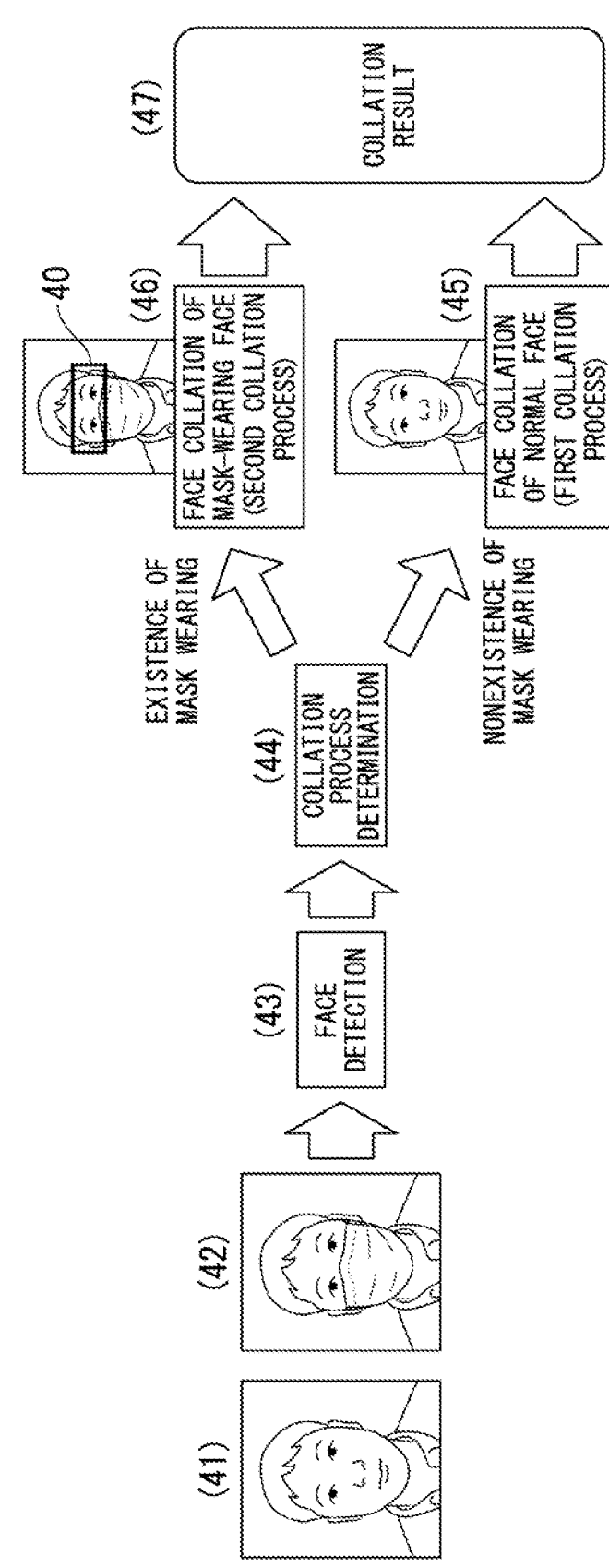
FIG. 4 is a sequence diagram showing an outline of processing of the collation device according to one exemplary embodiment of this disclosure.

FIG. 4 is a sequence diagram showing an outline of processing of a collation device.

The collation device 1 acquires from the camera 2 a mask-wearing face image (41) or a non-mask-wearing face image (42). In the collation process, the collation device 1 detects a person's face at first (43). Upon detecting the person's face, the collation device 1 determines the type of collation process to be performed subsequently according to a process corresponding to determination of existence or nonexistence of mask wearing (44). Upon determining the nonexistence of mask wearing, the collation device 1 performs a first collation process (i.e., a face collation for a normal face) (45). Upon determining the existence of mask wearing, the collation device 1 determines a specific area 40 covering a certain range with high reliability representing the result of detecting feature points, thus performing a second collation process (i.e., a face collation for a masked face) using the information of the specific area 40 (46). Thereafter, the collation device 1 outputs the result of the collation process (47).

A collation program may include a first collation program for performing the function of the first collation process and a second collation program for performing the function of the second collation process. Both the first collation program and the second collation program generally relate to programs for learning a plurality of non-mask-wearing face images and/or training data corresponding to face images via a machine-learning process such as neural networks and for calculating at least matching degrees between the inputted face images and comparative face images. In other words, the first collation program can be defined as a program using a model which is produced by a machine-learning process using a face image covering the entirety of a person's face while the second collation program can be defined as a program using a model which is produced by a machine-learning process using an image of the specific area 40 covering the eyes and eyebrows in a person's face region of a face image precluding its lower section. However, the specific area 40 is not necessarily limited to an upper section of a person's face region precluding its lower section. As described above, the specific area can be defined as an area covering a certain range with high reliability representing the result of detecting feature points in a person's face region. In this connection, the second collation program can be defined as a program for learning a plurality of mask-wearing face images and/or training data corresponding to face images via a machine-learning process such as neural networks and for calculating at least matching degrees between the input face images and comparative face images.

Specifically, the collation device 1 may generate a first model which is produced via a machine-learning process such as neural networks for learning an input/output relationship between the input information such as a face image covering the entirety of a person's face and the output information such as a matching degree representing an answer to a plurality of comparative face images recorded on a database. The collation device 1 generates a first collation program including a first model and a neural-network subprogram. The collation device 1 may generate the first model for calculating a matching degree about a plurality of comparative face images recorded on a database according to the input information such as a face image covering the entirety of a person's face by way of already-known techniques.

For example, the collation device 1 may generate a second model via a machine-learning process such as neural networks for learning an input/output relationship between the input information such as the specific area 40 covering the eyes and eyebrows in a person's face region of a face image precluding its lower section and the output information such as a matching degree representing an answer to a plurality of comparative face images recorded on a database. The collation device 1 generates a second collation program including a second model and a neural-network subprogram. The collation device 1 may generate a first model for calculating a matching degree about a plurality of comparative face images recorded on a database according to the input information such as the specific region 40 covering the eyes and eyebrows in a person's face region of a face image precluding its lower section by way of already-known techniques.

The collation device 1 stores a collation program including the first collation program and the second collation program.

The collation process unit 12 performs various functions such as a face detection module 21, a feature-point extraction module 22, a collation process determination module 23, a first collation processor 24, and a second collation processor 25.

The face detection module 21 is configured to detect a face region from a face image.

The feature-point extraction module 22 is configured to calculate feature-point positions included in a face image and to calculate reliability representing the result of detecting feature points.

The collation process determination module 23 is configured to determine whether to perform a collation process using the first collation program or a collation process using the second collation program according to each of feature points included in a face image and its reliability. This process corresponds to determination as to the existence/nonexistence of mask wearing. That is, the collation process using the first collation program is equivalent to a collation process to be performed during the nonexistence of mask wearing. The collation process using the second collation program is equivalent to a collation process to be performed during the existence of mask wearing.

The first collation processor 24 is configured to perform a first collation process of a face image using the first collation program. In this connection, the first collation processor 24 performs the first collation process using feature points in a face region upon determining a significant distribution of feature points with reliability, representing the result of detecting feature points in a predetermined area (e.g., the entirety of a face) in a face region, equal to or above the first threshold value.

The second collation processor 25 is configured to determine the specific area 40 in a face image using the second collation program, thus performing a collation process of a face image according to the specific area 40. In this connection, the second collation processor 25 performs the second collation process using feature points in a specific area (e.g., the specific area 40 having a rectangular shape described above) different from the predetermined area upon determining an insignificant distribution of feature points with reliability, representing the result of detecting feature points in a predetermined area (e.g., the entirety of a face), below the first threshold value.

Any user may concurrently wear a mask and sunglasses on his/her face. In this case, the specific area 40 may be assumed to be excessively small. For this reason, when the specific area 40 is smaller than a certain area, the second collation processor 25 may request a user to take off any outfitting member hiding parts of the user's face such as a mask and sunglasses by producing an audio message or by displaying a message. Thereafter, the second collation processor 25 determines the specific area 40 of a face image using the second collation program again.

The aforementioned description refers to an example in which the collation device 1 is configured to carry out a single program as the second collation program. However, the collation device 1 may carry out a two or more programs as the second collation program. As one modified example, a plurality of second collation programs is associated with different specific areas 40. For example, one second collation program may be associated with the specific area 40 representing the upper section of a face image (in other words, the upper half of a user's face is not covered by any outfitting member). Another second collation program may be associated with the specific area representing the lower section of a face image (in other words, the lower half of a user's face is not covered with any outfitting member). At first, the second collation processor 25 determines the specific area 40 in a face image. The second collation processor 25 selects any one of second collation programs according to the position or range of the specific area 40. Subsequently, the second collation processor 25 executes the second collation process using the selected second collation program.

In the present modified example, the collation device 1 is able to accurately perform users' collations by properly using multiple second collation programs irrespective of whether a user wears a mask or sunglasses.

First Exemplary Embodiment

Figure 5:
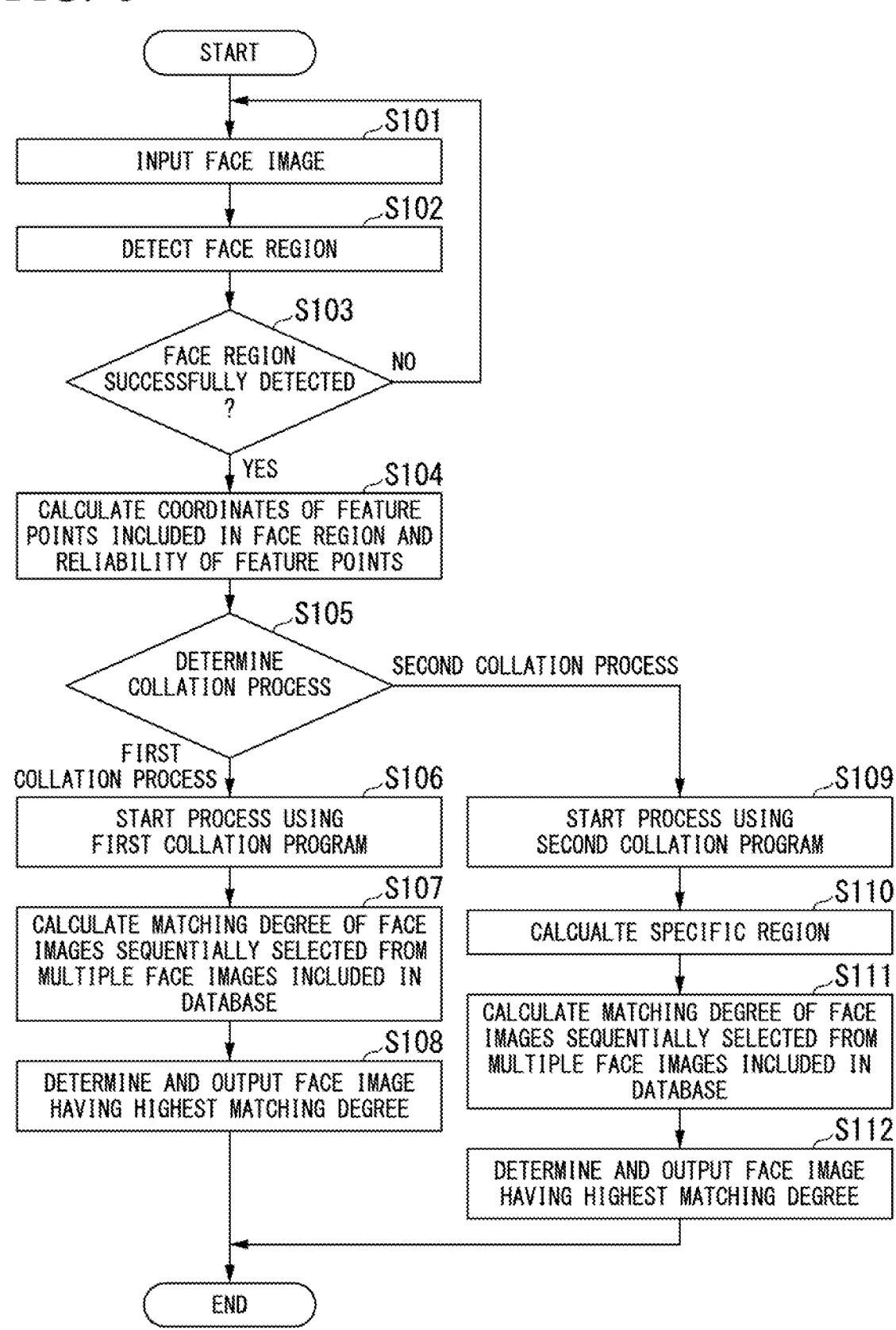
FIG. 5 is a flowchart showing the processing of a collation device according to one exemplary embodiment of this disclosure.

FIG. 5 is a flowchart showing the processing of a collation device according to the first exemplary embodiment.

Hereinafter, the flow of processing of the collation device 1 will be described in detail.

A user of the collation system 100 may approach the camera 2 for the purpose of collating his/her images. The camera 2 captures a user's face to generate a face image. The camera 2 outputs the face image to the collation device 1. The input unit 11 of the collation device 1 inputs the face image (step S101). The input unit 11 outputs the face image to the collation process unit 12. In step S101, the camera 2 may capture a user's image when the user is not paying attention to the camera 2. For example, the camera 2 may determine the timing to capture an image of a user's face according to his/her status such as a direction or a position of a user's face.

The face detection module 21 of the collation process unit 12 acquires a face image. The face detection module 21 detects a face region of a user reflected in the face image (step S102). The face region may cover the eyes, nose, mouth, eyebrows, jaw, forehead, cheeks, and the like. For example, the face region does not necessarily cover hair. In this connection, the face detection module 21 may use already-known techniques when detecting face regions. Alternatively, the face detection module 21 may input a face image to a face-detection program so as to acquire a face region output from the face-detection program. The face-detection program can be defined as a program to be generated using a model which is produced via the machine learning of the input/output relationship between the input information such as a face image and the output information such as a face region. The face detection module 21 determines whether to detect a face region according to the result of detecting the face region (step S103). Upon detecting the face region, the face detection module 21 outputs the image information of the face region to the feature-point extraction module 22. Upon failing to detect the face region, the face detection module 21 terminates its process to wait for a next face image input thereto.

The feature-point extraction module 22 calculates reliability representing the result of detecting feature points and coordinates of feature points included in the face region based on the image information of the face region (step S104). In this connection, the feature-point extraction module 22 may input the image information of the face region into a feature-point extraction program to acquire feature points output from the feature-point extraction program and/or reliability representing the result of detecting feature points. The feature-point extraction program can be defined as a program to be generated using a model which is produced by the machine learning of the input/output relationship between the input information such as the image information of a face region and the output information such as feature points included in the face region and reliabilities. The feature-point extraction module 22 outputs to the collation process determination module 23 feature points (e.g., coordinates) calculated from the face region and reliability representing the result of detecting feature points. The feature-point extraction module 22 may calculate coordinates of facial feature points and reliability representing the result of detecting feature points by way of already-known techniques. As one modified example, the feature-point extraction program can be defined as a program to be generated using a model which is produced by the machine learning of the input/output relationship between the input information such as the image information of a face region and the output information such as feature points included in the face region and parameters (e.g., 0 or 1) representing the existence/nonexistence of any outfitting member partially hiding a person's face. In this case, the feature-point extraction program may learn in advance how to determine the existence/nonexistence of any outfitting member partially hiding a person's face according to the input information and to output parameters representing the determination result. The following descriptions refer to the feature-point extraction module 22 configured to output reliability. However, the feature-point extraction module 22 may output parameters representing the existence/nonexistence of any outfitting member partially hiding a person's face instead of reliability. In this case, the phrase "reliability representing the result of detecting feature points" can be rephrased as "parameters" in the following descriptions.

The collation process determination module 23 acquires reliability and feature points included in a face region calculated by the feature-point extraction module 22. The collation process determination unit 23 determines a colla- tion process according to reliability representing the result of detecting feature points detected in a face region (step S105).

Specifically, the collation process determination module 23 determines feature points with reliability representing the result of detecting feature points in a face region equal to or higher than the first threshold value. The feature points each having a reliability equal to or higher than the first threshold value would be assumed as reliable feature points reliably showing their features. The collation process determination module 23 determines to perform the first collation process due to the nonexistence of mask wearing when feature points each having a reliability equal to or higher than the first threshold value in a face region are distributed over facial parts such as the eyebrows, eyes, nose, mouth, and the like. In this connection, the collation process determination module 23 may determine to perform the first collation process due to the nonexistence of mask wearing when the number of feature points with reliability equal to or higher than the first threshold value can be detected in a statisti- cally-significant manner at facial parts such as the eyebrows, eyes, nose, mouth, and the like according to a distribution of feature points with reliability equal to or higher than the first threshold value in a face region.

The collation process determination module 23 may determine the lower section of a face region based on coordinate information representing a face region or the like so as to perform a collation process based on the number and distribution of highly-reliable feature points in the lower section of a face region as well as statistical information. The collation process determination module 23 may perform the second collation process when the number of highly-reliable feature points in the lower section of a face region is smaller than a prescribed threshold value or when the distribution of highly-reliable feature points and/or statistical information do not include significant feature points (corresponding to the existence of mask wearing), otherwise, the collation process determination module 23 may perform the first collation process.

Alternatively, the collation process determination module 32 may input into a collation-process determination program coordinates of feature points detected in a face region and reliability representing the result of detecting feature points, thus determining whether to perform the first collation process or the second collation process. The collation- process determination program can be defined as a program to be generated using a model which is produced via the machine learning of the input/output relationship between the input information as coordinates of feature points detected in a face region and their reliability and the output information representing the result of determining either the first collation process corresponding to the existence of mask wearing or the second collation process corresponding to the nonexistence of mask wearing.

As described above, the collation process determination module 23 produces a result of determination indicating either the first collation process or the second collation process. Upon determining the first collation process, the collation process determination module 23 instructs the first collation processor 24 to perform its process. Upon deter- mining the second collation process, the collation process determination module 23 instructs the second collation processor 25 to perform its process.

Upon determining to perform the first collation process, the first collation processor 24 inputs a face image. The first collation processor 24 starts its process using the first collation program (step S106). In this process, the first collation processor 24 inputs a face image obtained from the camera 2. In addition, the first collation processor 24 inputs face images sequentially selected from among a plurality of face images included in the database 104. The first collation processor 24 calculates a matching degree between the face image input from the camera 2 and each face image selected from among a plurality of face images (comparative sub- jects) included in the database 104 with respect to each of face images sequentially selected from among a plurality of face images included in the database 104 (step S107). As described above, the first collation program can be defined as a program using a model which is produced by a machine-learning process. Accordingly, the first collation processor 24 is able to calculate a matching degree between the face image input from the camera 2 and each face image selected from the database 104. The first collation processor 24 outputs to the output unit 13 a matching degree between the input face image from the camera 2 and each face image selected from the database 104. The output unit 13 deter- mines a specific face image having the highest matching degree calculated from the database 104 as a highest- matching face image highly matchable to the input face image from the camera 2, thus outputting the highest- matching face image to the display device 3 (step S108).

Upon determining to perform the second collation pro- cess, the second collation processor 25 inputs a face image. The second collation processor 25 starts its process using the second collation program (step S109). In this process, the second collation processor 25 inputs a face image obtained from the camera 2. The second collation processor 25 calculates the specific area 40 having a rectangular shape in the upper section of a face region (step S110). The specific area 40 can be defined as an area including feature points with reliability representing the result of detecting feature points equal to or above the first threshold value. Thus, it is possible to determine the specific area 40 as a certain range of a person's face not covered with a mask or the like. The specific area 40 may be an area covering a certain range of a person's face such as the eyes, eyebrows, and forehead. The specific area 40 may be depicted by any shape other than a rectangular shape. It is possible to calculate the specific area 40 as an area which would be output from a certain process using a specific-area-calculating subprogram included in the second collation program when inputting the input information such as a face image or a face region calculated from the face image. In this connection, the specific-area-calculating subprogram can be defined as a subprogram to be generated using a model which is pro- duced via the machine learning of the input/output relation- ship between the input information such as a face image or a face region calculated from the face image and the output information such as the specific area 40 having a rectangular shape in the upper section of the face region. By determining a rectangular area, it is possible to determine a facial range subjected to a collation process even when a face region of a face image is covered with a mask or the like.

In calculating the specific area 40, the second collation processor 25 may determine the size of the specific area 40 relative to the size of a face image. In addition, the second collation processor 25 may extend the specific area 40, included in a face region of a face image, over a facial range including highly-reliable feature points. When a user wears an outfitting member to partially shield a user's face such as an eye patch over one eye, it is possible to calculate the specific area 40 as a facial range of distributing highly-reliable feature points precluding facial parts (e.g., an eye with an eye patch) with low reliability representing the result of detecting feature points due to the outfitting member. Specifically, when a user wears an eye patch on the right eye, the second collation processor 25 may calculate the specific area as a facial range other than the right eye. In this case, the second collation processor 25 may select from among second collation programs including models, which are produced via machine learning responsive to types of outfitting members such as a mask, eye patches, hats, and the like, a second collation program corresponding to an area (i.e., the specific area 40) for distributing highly-reliable feature points in an image acquired from the camera 2, thus performing the second collation process using the selected second collation program. The specific area 40 is not necessarily limited to a rectangular area in the upper section of a face region. The present disclosure may embrace any technique to execute either the first collation process or the second collation process based on the result of determining whether or not a person's face is covered by a mask or other outfitting members such as an eye patch as well as the position and/or the range of the specific area 40 of a facial region not shielded by any outfitting member.

The second collation processor 25 inputs face images sequentially selected from among a plurality of face images included in the database 104. The second collation processor 25 calculates a matching degree between the specific area 40 of a face region of a face image input from the camera 2 and the specific area corresponding to a face region of a face image selected from a plurality of face images included in the database 104 with respect to each of face images sequentially selected from among a plurality of face images included in the database 104 (step S111). As described above, the second collation program can be defined as a program which is produced by the machine-learning process. Therefore, the second collation processor 25 is able to calculate a matching degree between the specific area 40 identified from a face region of a face image input from the camera 2 and the specific area 40 corresponding to a face region of each face image selected from the database 104. The second collation processor 25 outputs to the output unit 13 a matching degree between the specific area 40 of a face region of a face image input from the camera 2 and the specific area 40 corresponding to face region of each face image selected from the database 104. The output unit 13 determines a face image having the highest matching degree calculated from the database 104 as a face image having the highest similarity to the input face image from the camera 2, thus outputting the face image to the display device 3 (step S112).

According to the aforementioned procedure, the collation device 1 determines a face image matched with the face image obtained from the camera 2 among a plurality of face images stored therein using the first collation process due to high reliability representing the result of detecting feature points in a face region when a user does not wear a mask. In addition, the collation device 1 determines a face image matched with the face image obtained from the camera 2 among a plurality of face images stored therein using the second collation process due to low reliability representing the result of detecting feature points in the lower section of a face region covering the mouth and nose when a user wears a mask. Accordingly, it is possible to appropriately use a preferable collation process differently with respect to a first case in which a user's face is not partially covered with a mask and a second case in which a user's face is partially covered with a mask, and therefore it is possible to improve the accuracy of collation.

In the aforementioned procedure, it is possible to determine the specific area 40 used for the second collation process responsive to the size of a face image or the size of a face region of a face image. Accordingly, it is possible to secure appropriate accuracy of collation responsive to the size of a face image.

Second Exemplary Embodiment

In the aforementioned procedure, the collation device 1 may normalize and output a score representing a matching degree produced by the first collation process or a score representing a matching degree produced by the second collation process. In this case, the collation device 1 may normalize a score representing a matching degree according to the size of a face region and the size of the specific area 40, the number of feature points, and/or reliability representing the result of detecting feature points. For example, the collation device 1 may apply to a score a weight corresponding to the number of feature points used for calculating the score. Herein, a weight of a score will become smaller as the number of feature points used for calculating the score becomes smaller. In other words, the collation device 1 may reduce the score as the number of feature points used for calculation of the score becomes smaller. In this case, the collation device 1 may use a normalized-score calculation formula. The collation device 1 inputs into the normalized-score calculation formula the size of a face region, the number of feature points, reliability representing the result of detecting feature points, and a score representing a matching degree, thus outputting a score value after normalization. The output unit 13 may output a score value representing a matching degree after normalization according to the aforementioned process. Alternatively, the output unit 13 may determine and output a face image having the highest score value corresponding to the highest matching degree among a plurality of face images recorded on the database 104. Alternatively, the output unit 13 may output the user information recorded in advance and associated with a face image having the highest score value corresponding to the highest matching degree among a plurality of face images recorded on the database 104. According to the normalization process described above, it is possible to integrate reliability of scores corresponding to matching degrees indicated by the results of the first collation process and the second collation process.

Third Exemplary Embodiment

It is possible to assume that reliability representing the result of detecting feature points may approach the first threshold value when a user of the collation system 100 wears a mask to expose the nose to outside air or when a user wears a specially-designed mask solely covering the mouth. When the collation process determination module 23 fails to determine which collation process between the first collation process and the second collation process is to be selectively used according to reliability representing the result of detecting feature points in a face image obtained from the camera 2, the collation device 10 may request a user to take off an outfitting member partially shielding the face such as a mask or sunglasses using an audio message or a displayed message. Thereafter, the collation process determination module 23 may determine again which collation process between the first collation process and the second collation process is to be selectively used according to reliability.

Alternatively, the collation process determination module 23 may determine to perform collation using both the collation processes. Specifically, the collation process determination module 23 may determine to perform collation using both the first collation process and the second collation process due to uncertainty as to whether a face would be covered with a mask or the like when reliability representing the result of detecting feature points in a predetermined area (e.g., an area including the mouth and nose) specified in a face image or most of reliability representing the results of detecting feature points in a face image lies between a second threshold value above the first threshold value and a third threshold value below the first threshold value.

Similar to the first exemplary embodiment, both the first collation processor 24 and the second collation processor 25 perform their collation processes. Subsequently, the first collation processor 24 and the second collation processor 25 output to the output unit 13 face images input from the camera 2 and matching degrees calculated for face images specified in the database 104. The output unit 13 calculates an average value of matching degrees produced by the collation processes using face images specified in the database 104, thus determining and outputting a face image having the highest average value as a face image matched with the face image obtained from the camera 2. Alternatively, the output unit 13 may use another statistical process than average value calculations to calculate scores corresponding to matching degrees after the statistical process using the collation processes of face images specified in the database 104, thus determining and outputting a face image having the highest score as a face image matched with the face image obtained from the camera 2. The output unit 13 may apply predetermined weights to matching degrees calculated using the collation processes of face images specified in the database 104 so as to calculate scores corresponding to matching degrees by integrating the collation processes, thus determining and outputting a face image having the highest score as a face image matched with the face image obtained from the camera 2.

According to the aforementioned procedure, it is possible to improve the accuracy of collation irrespective of how a user wears a mask or even when a user wears a specially-designed mask.

Figure 6:
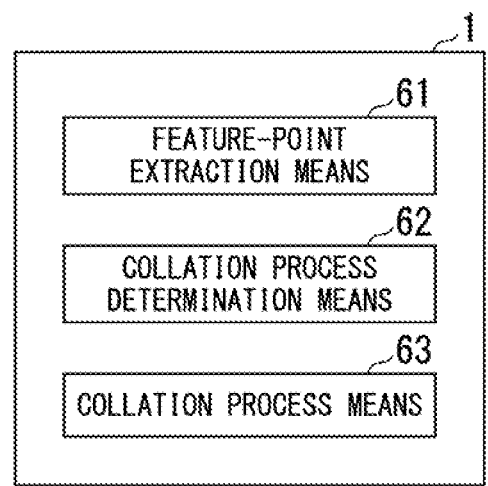
FIG. 6 is a block diagram showing the minimum configuration of a collation device according to one exemplary embodiment of this disclosure.

FIG. 6 is a block diagram showing the minimum configuration of a collation device.

Figure 7:
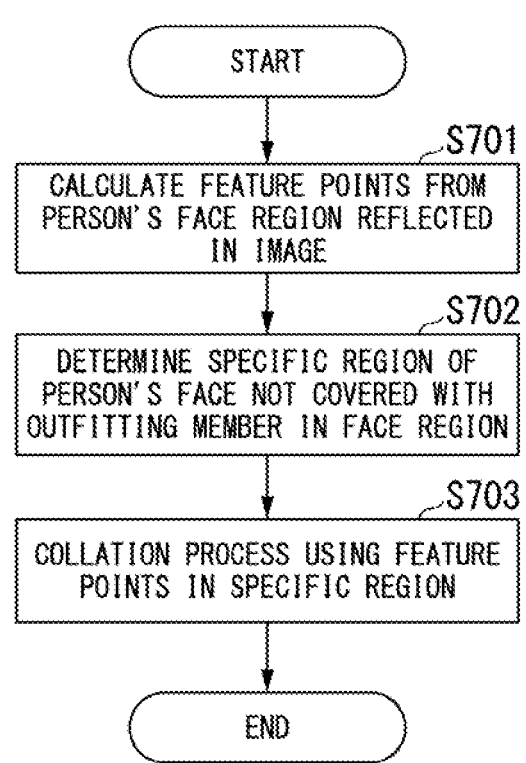
FIG. 7 is a flowchart showing the processing of the collation device having the minimum configuration in this disclosure.

FIG. 7 is a flowchart showing the processing of the collation device having the minimum configuration.

The collation device 1 includes at least a feature-point extraction means 61, a collation process determination means 62, and a collation process means 63.

The feature-point extraction means 61 calculates feature points from a face region of a person reflected in an image (step S701).

The collation process determination means 62 determines the specific area 40 representing a person's face not covered with any outfitting member in a face region (step S702).

The collation process means 63 performs a collation process using feature points in the specific area 40 (step S703).

The aforementioned devices include computer systems therein. Subsequently, the foregoing processes are stored on computer-readable storage media in the form of programs, wherein a computer system may read and execute programs to achieve the foregoing processes. Herein, computer-readable storage media refer to magnetic disks, magneto-optical disks, CD-ROM, DVD-ROM, semiconductor memory, and the like. In addition, it is possible to deliver computer programs through communication lines, and therefore a computer may receive and execute computer programs delivered thereto.

The foregoing programs may achieve some of the foregoing functions. Moreover, the foregoing programs may be differential files (or differential programs) which can be combined with pre-installed programs of a computer system to achieve the foregoing functions.

REFERENCE SIGNS LIST

1 . . . collation device
2 . . . camera
3 . . . display device
11 . . . input unit
12 . . . collation process unit
13 . . . output unit
21 . . . face detection module
22 . . . feature-point extraction module
23 . . . collation process determination module
24 . . . first collation processor
25 . . . second collation processor
40 . . . specific area
100 . . . collation system

What is claimed is:

1. A collation device comprising:
a memory configured to store instructions:
a processor configured to execute the instructions to:
    detect a feature point in a face region of a person reflected in an image;
    determine a specific area in which a person's face is not covered with an outfitting member in the face region;
    perform collation using the feature point in the specific area;
    perform a first collation process using the feature point in the face region when reliability representing a result of detecting the feature point is equal to or above a first threshold value; and
    perform a second collation process using the feature point in the specific area of the face region when reliability representing a result of detecting the feature point is below the first threshold value,
    wherein both the first collation process and the second collation process are performed when the reliability lies in a range between the first threshold value used to determine whether the reliability is high and a second threshold value greater than the first threshold value or in a range between the first threshold value and a third threshold value less than the first threshold value.

2. The collation device according to claim 1, wherein the first collation process is performed via a first collation function implemented by machine learning using an image covering an entirety of the face region of the person as first training data while the second collation process is performed via a second collation function implemented by machine learning using an image covering the specific area precluding a lower section of the face region of the person as second training data.

3. The collation device according to claim 1, wherein the specific area is an upper section of the face region having a rectangular shape.

4. The collation device according to claim 1, wherein the processor is configured to normalize and output a first score representing a first matching degree produced by the first collation process or a second score representing a second matching degree produced by the second collation process.

5. The collation device according to claim 1, wherein the specific area is an area having the reliability representing the result of detecting the feature point equal to or above the first threshold value.

6. The collation device according to claim 1, wherein after detecting the feature point from the face region of the person reflected in the image, the processor is configured to determine existence or nonexistence of the outfitting member partially covering the person's face, wherein upon determining the nonexistence of the outfitting member, the processor is configured to perform a first collation process using a first model produced by learning, and wherein upon determining the existence of the outfitting member, the processor is configured to determine the specific area in which the person's face is not covered by the outfitting member in the face region and to perform a second collation process using the feature point in the specific area and a second model produced by learning.

7. The collation device according to claim 1, wherein the processor is further configured to:

calculate a plurality of feature points in the face region of the person reflected in the image and reliability for a predetermined feature point among the plurality of feature points; and determine whether to perform a first collation process for nonexistence of the outfitting member covering the person's face in the face region or a second collation process for existence of the outfitting member covering the person's face in the face region based on the reliability of the predetermined feature point, wherein the first collation process is performed using the feature point in the face region, and wherein the second collation process is performed using the feature point in the specific area which is enlarged according to the reliability of the predetermined feature point among the plurality of feature points.

8. A collation method executed by a computer, the method comprising:

detecting a feature point in a face region of a person reflected in an image;

determining a specific area in which a person's face is not covered with an outfitting member in the face region;

performing collation using the feature point in the specific area;

performing a first collation process using the feature point in the face region when reliability representing a result of detecting the feature point is equal to or above a first threshold value; and performing a second collation process using the feature point in the specific area of the face region when reliability representing a result of detecting the feature point is below the first threshold value, wherein both the first collation process and the second collation process are performed when the reliability lies in a range between the first threshold value used to determine whether the reliability is high and a second threshold value greater than the first threshold value or in a range between the first threshold value and a third threshold value less than the first threshold value.

9. The collation method according to claim 8, further comprising:

after detecting the feature point from the face region of the person reflected in the image, determining existence or nonexistence of the outfitting member partially covering the person's face;

upon determining the nonexistence of the outfitting member, performing a first collation process using a first model produced by learning; and upon determining the existence of the outfitting member, determining the specific area in which the person's face is not covered by the outfitting member in the face region and perform a second collation process using the feature point in the specific area and a second model produced by learning.

10. The collation method according to claim 8, further comprising:

calculating a plurality of feature points in the face region of the person reflected in the image and reliability for a predetermined feature point among the plurality of feature points; and determining whether to perform a first collation process for nonexistence of the outfitting member covering the person's face in the face region or a second collation process for existence of the outfitting member covering the person's face in the face region based on the reliability of the predetermined feature point, wherein the first collation process is performed using the feature point in the face region, and wherein the second collation process is performed using the feature point in the specific area which is enlarged according to the reliability of the predetermined feature point among the plurality of feature points.

11. A non-transitory computer-readable storage medium for storing a program causing a computer of a collation device to execute:

detecting a feature point in a face region of a person reflected in an image;

determining a specific area in which a person's face is not covered with an outfitting member in the face region;

performing a collation using the feature point in the specific area;

performing a first collation process using the feature point in the face region when reliability representing a result of detecting the feature point is equal to or above a first threshold value; and performing a second collation process using the feature point in the specific area of the face region when reliability representing a result of detecting the feature point is below the first threshold value, wherein both the first collation process and the second collation process are performed when the reliability lies in a range between the first threshold value used to determine whether the reliability is high and a second threshold value greater than the first threshold value or in a range between the first threshold value and a third threshold value less than the first threshold value.

* * * * *